Figure 1:
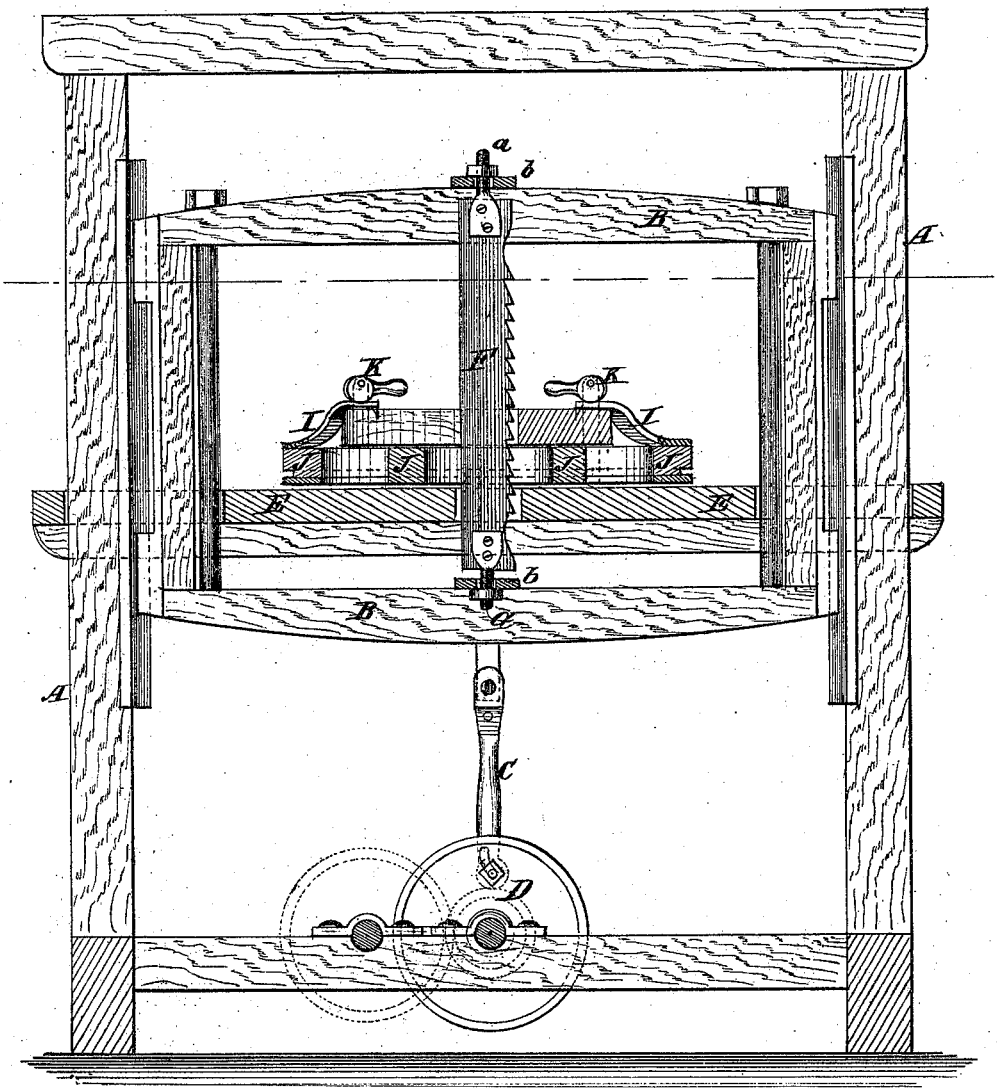

2 Sheets--Sheet 1.

JOHN B. ZIMMERMAN.

Improvement in Machines for Sawing Fellies.

No. 126,768.

Patented May 14, 1872.

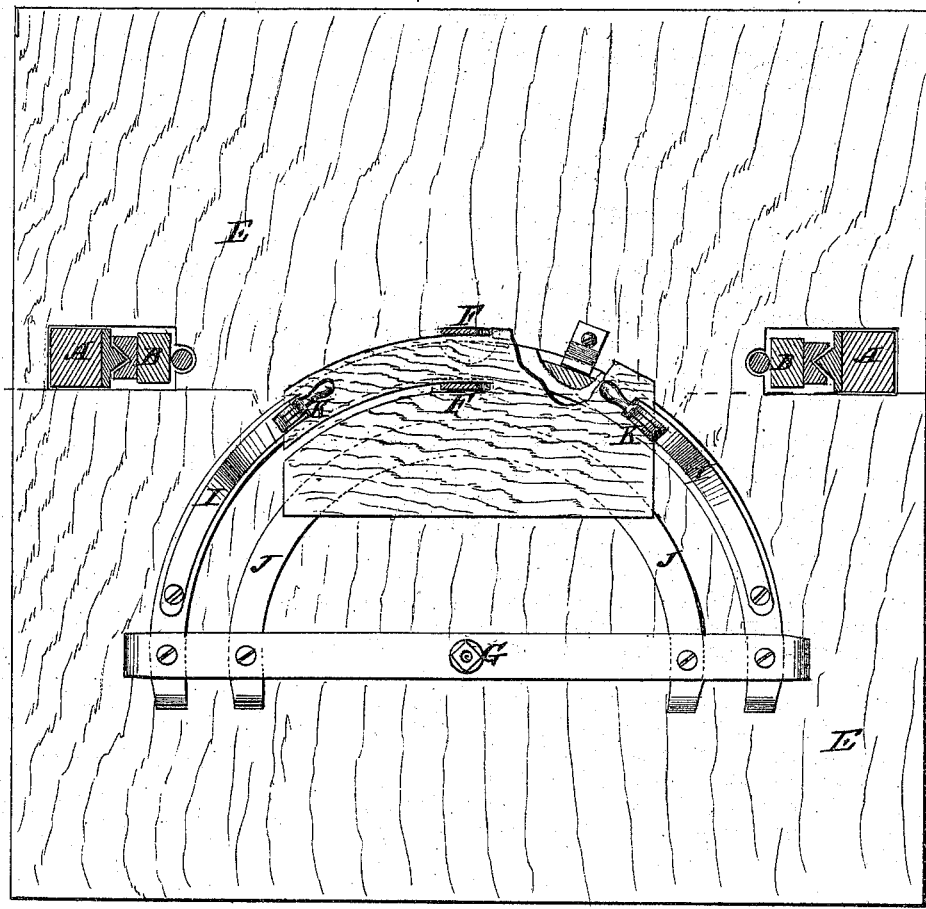

No. 126,768

UNITED STATES PATENT OFFICE.

JOHN B. ZIMMERMAN, OF FORT SENECA, OHIO.

IMPROVEMENT IN MACHINES FOR SAWING FELLIES.

Specification forming part of Letters Patent No. 126,768, dated May 14, 1872.

Specification describing a new and Improved Felly-Sawing Machine, invented by JOHN B. ZIMMERMAN, of Fort Seneca, in the county of Seneca and State of Ohio.

The invention consists in improving machines for sawing both curved sides of a felly, as hereinafter fully described and subsequently pointed out in the claim.

The saws are mounted in the sash, so that they may be turned around on their vertical axes to shift for sawing straight stuff, when the felly-carriage is removed and a straight guide applied. One of the saws is adjustable toward and from the other, for cutting different thicknesses.

Figure 1 is a sectional elevation of my improved sawing-machine, and Fig. 2 is a horizontal section.

Similar letters of reference indicate corresponding parts.

A represents the frame; B, the gate; C, the connecting-rod; D, the crank or driving-wheel; and E, the table, all of which are substantially like the ordinary sawing-machines of this character. I arrange two saws, F, in the said gate, as far apart as the depth of the felly to be sawed, for sawing both the outer and inner curves at once; and the saws are arranged for adjustment toward or from each other by having the straining-bolts $a$ fitted in slotted plates $b$, to vary them for fellies of different thicknesses; and I combine with said saws a circular carriage, J, pivoted in front of the saw at G, the said pivot being as far from the saws as the radius of the wheel for which the fellies are designed; and the said carriage is to be provided with numerous center-holes, H, for the pivot-pin, to shift it for cutting fellies for wheels of different sizes. I represents spring clamps, with clamping eccentrics K arranged on the carriage so as to clamp the plank to be sawed at each end by being forced down on the top of it, as shown, to hold it while sawing.

By taking out one saw and turning the other a quarter of a revolution it may be used for ordinary straight or curved sawing; and by turning both saws about an eighth of a revolution and fixing a gauge parallel with them the two may be used for sawing straight parallel stuff, and the adjustable one may be shifted for stuff of different widths.

Having thus described my invention, I claim as new and desire to secure by Letters Patent—

The vibratory feed-carriage, provided with spring clamps I I, slatted near their ends, and fitting over posts, to which are pivoted cam-levers K K, as and for the purpose described.

JOHN B. ZIMMERMAN.

Witnesses:
GEO. SETZLER,
ELI STALEY.